United States Patent Office 2,739,978
Patented Mar. 27, 1956

2,739,978

DIALKYL MONOARYL ESTERS OF ORTHO-PHOSPHORIC ACID

Harry R. Gamrath and Roger E. Hatton, St. Louis, Mo., assignors to Monsanto Chemical Company, St. Louis, Mo., a corporation of Delaware No Drawing. Application November 6, 1950,
Serial No. 194,372

16 Claims. (Cl. 260—461)

This invention relates to certain novel dialkyl monoaryl esters of ortho-phosphoric acid having the formula

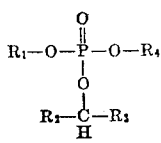

wherein $R_1$ represents an alkyl radical terminating with a $CH_2$ group and preferably containing from 1 to 18 carbon atoms, $R_2$ and $R_3$ represent alkyl radicals and preferably alkyl radicals which together contain not more than 17 carbon atoms, and $R_4$ represents an aryl radical. This invention also relates to a process for the preparation of the above described phosphate esters.

Because of their very low pour point, high autogeneous ignition temperature and stability against decomposition, the novel phosphate esters of this invention have been found to possess outstanding utility in the field of functional fluids where they are particularly useful as synthetic lubricants, damping fluids, bases for greases, and force transmission fluids (hydraulic fluids). Furthermore, because of their compatibility with paraffinic hydrocarbon oils, these novel phosphate esters may be combined with paraffinic hydrocarbon oils to prepare hydraulic and torque converter fluids having highly desirable characteristics. These esters may also be used as film forming addition agents for extreme pressure lubricants and as the liquid medium for filters for air conditioning systems.

These esters also exhibit outstanding utility as plasticizers for vinyl halide-containing polymers, such as polyvinyl chloride or vinyl chloride copolymerized with unsaturated materials copolymerizable therewith, and as plasticizers for the various cellulose esters and ethers and cellulose nitrate. The plasticized vinyl halide-containing polymers have been found to be exceedingly stable and exceptionally flexible, particularly at low temperatures.

The novel esters of this invention may be prepared by reacting phosphorus oxychloride and a primary alkyl alcohol preferably containing from 1 to 18 carbon atoms to form the corresponding alkyl phosphoryl dichloride, reacting the alkyl phosphoryl dichloride thus formed with a secondary alkyl alcohol preferably containing from 3 to 18 carbon atoms to form the corresponding dialkyl phosphoryl monochloride, and reacting the dialkyl phosphoryl monochloride with an alkali metal salt of a phenol, thereby forming the dialkyl monoaryl phosphate.

The following examples are illustrative, but not limitative, of the novel compounds of this invention and their manner of preparation:

EXAMPLE I

*n-Butyl sec-tetradecyl phenyl phosphate*

A round-bottom, 3-neck flask is fitted with an agitator, thermometer, dropping funnel and an exhaust vent and charged with 76.7 g. of phosphorus oxychloride. The phosphorus oxychloride is cooled to a temperature below 15° C., and while maintaining a temperature below 15° C., 37.1 g. of n-butanol are added in a drop-wise fashion. After all of the n-butanol is charged, the temperature of the mixture is allowed to rise to 25° C. while constantly agitating the mixture. During this period, gaseous hydrogen chloride is evolved, and towards the end of the reaction a reduced pressure is gradually applied to the reaction mixture. While maintaining a temperature of about 25° C., the pressure is reduced until an absolute pressure of 50 mm. Hg is attained, and at this pressure and temperature the reaction mixture is stirred until it is essentially free of gaseous hydrogen chloride.

The pressure is then released and the substantially pure n-butyl phosphoryl dichloride cooled to a temperature in the range of 10°–15° C. and, with constant agitation, 107.2 g. of sec-tetradecanol (7-ethyl-2-methyl-4-undecanol) are added dropwise maintaining a reaction temperature of 10°–15° C. After all of the sec-tetradecanol is charged, the temperature of the reaction mixture is allowed to rise to about 25° C. with continuous agitation. A reduced pressure is again gradually applied to the reaction mixture until an absolute pressure at 10–20 mm. Hg absolute at a temperature of 20–25° C. is attained, which conditions are maintained for approximately 40–60 hours with constant agitation to complete the formation of n-butyl sec-tetradecyl phosphoryl monochloride.

To a 3-neck flask, fitted with an agitator, a thermometer and a dropping funnel are charged 62.5 g. of phenol and 90 g. of water. With constant agitation 53.4 g. of a 49.6% solution of sodium hydroxide are added. Then, while maintaining a reaction mixture temperature below about 25° C., the n-butyl sec-tetradecyl phosphoryl monochloride above prepared is added drop-wise with constant agitation. After all of the dialkyl phosphoryl monochloride is charged, the reaction mixture is stirred for three more hours and then allowed to separate into two layers or phases. The aqueous phase is withdrawn and discarded. The ester layer is then washed with 2% aqueous sodium hydroxide. The ester layer is then washed with water until it is no longer alkaline to phenolphthalein test paper. Volatile matter is then removed from the ester by steaming and finally the ester is then washed with water until neutral and then dried by heating the ester under reduced pressure and at a temperature of 90°–100° C.

94.4 g. of n-butyl sec-tetradecyl phenyl phosphate are thus obtained having the following physical properties:

| | |
|---|---|
| Specific gravity at 25°/25° C | 0.9316 |
| $N_D^{25}$ | 1.4588 |
| Pour point, ° F | below —65 |
| Viscosity, centistokes: | |
| At 210° F | 2.5 |
| At 100° F | 12.3 |

EXAMPLE II

*n-Hexyl sec-amyl p-cresyl phosphate*

In accordance with the procedure described in Example I, n-hexyl sec-amyl p-cresyl phosphate is obtained utilizing the following ingredients:

| | G. |
|---|---|
| Phosphorus oxychloride | 153.4 |
| n-Hexanol | 102.1 |
| Sec-amyl alcohol | 88.2 |
| p-Cresol | 113.5 |
| Sodium hydroxide (assay 49.6%) | 84.7 |
| Water | 160.0 |

EXAMPLE III

*2-ethylhexyl sec-butyl phenyl phosphate*

In accordance with the procedure described in Example I, 2-ethylhexyl sec-butyl phenyl phosphate is obtained utilizing the following ingredients:

|  | G. |
|---|---|
| Phosphorus oxychloride | 153.4 |
| 2-ethylhexanol | 130.2 |
| Sec-butanol | 74.1 |
| Phenol | 119.0 |
| Sodium hydroxide (assay 48.1%) | 105.0 |
| Water | 170.0 |

From the ingredients listed, 212.0 g. of 2-ethylhexyl sec-butyl phenyl phosphate are obtained which has the following properties:

| | |
|---|---|
| Specific gravity at 25°/25° C | 1.0342 |
| $N_D^{25}$ | 1.4783 |
| Pour point, ° F | below −65 |
| Viscosity, centistokes: | |
| At 210° F | 2.0 |
| At 100° F | 7.3 |

EXAMPLE IV

*2-ethylhexyl sec-butyl cresyl phosphate*

In accordance with the procedure described in Example I, 2-ethylhexyl sec-butyl cresyl phosphate is obtained utilizing the following ingredients:

|  | G. |
|---|---|
| Phosphorus oxychloride | 153.4 |
| 2-ethylhexanol | 130.2 |
| Sec-butanol | 81.5 |
| Cresol | 126.5 |
| Sodium hydroxide (assay 49.6%) | 94.4 |
| Water | 160.0 |

In this example the cresol used is of coal tar origin and is made up mainly of meta and para cresol together with a small amount of o-cresol and some xylenols.

From the charges listed, 169.8 g. of 2-ethylhexyl sec-butyl cresyl phosphate are produced which has the following properties:

| | |
|---|---|
| Specific gravity at 25°/25° C | 1.0158 |
| $N_D^{25}$ | 1.4748 |
| Pour point, ° F | below −65 |
| Viscosity, centistokes: | |
| At 210° F | 2.3 |
| At 100° F | 8.9 |
| At −40° F | 3500 |

EXAMPLE V

*2-ethylhexyl sec-butyl p-chlorophenyl phosphate*

In accordance with the procedure described in Example I, 2-ethylhexyl sec-butyl p-chlorophenyl phosphate is obtained utilizing the following ingredients:

|  | G. |
|---|---|
| Phosphorus oxychloride | 153.4 |
| 2-ethylhexanol | 130.2 |
| Sec-butanol | 81.5 |
| p-Chlorophenol | 150.5 |
| Sodium hydroxide (assay 49.6%) | 94.4 |
| Water | 160.0 |

From these materials 208.6 g. of 2-ethylhexyl sec-butyl p-chlorophenyl phosphate are obtained which the following properties:

| | |
|---|---|
| Specific gravity 25°/25° C | 1.0961 |
| $N_D^{25}$ | 1.4843 |
| Pour point, ° F | below −65 |
| Viscosity, centistokes: | |
| At 210° F | 2.4 |
| At 100° F | 11.0 |

EXAMPLE VI

*2-ethylhexyl capryl phenyl phosphate*

In accordance with the procedure described in Example I, 2-ethylhexyl capryl phenyl phosphate is obtained utilizing the following ingredients:

|  | G. |
|---|---|
| Phosphorus oxychloride | 306.8 |
| 2-ethylhexanol | 260.4 |
| Capryl alcohol | 325.5 |
| Phenol | 194.6 |
| Sodium hydroxide (assay 49.6%) | 167.0 |
| Water | 280.0 |

These quantities of materials yield 422.2 g. of 2-ethylhexyl capryl phenyl phosphate. The ester has the following properties:

| | |
|---|---|
| Specific gravity 25°/25° C | 0.9876 |
| $N_D^{25}$ | 1.4687 |
| Pour point, ° F | below −65 |
| Viscosity, centistokes: | |
| At 210° F | 2.3 |
| At 100° F | 8.6 |
| At −40° F | 1710 |
| Flash point, ° F | 350 |
| Fire point, ° F | 430 |

EXAMPLE VII

*Methyl capryl phenyl phosphate*

In accordance with the procedure described in Example I, methyl capryl phenyl phosphate is obtained utilizing the following ingredients:

|  | G. |
|---|---|
| Phosphorus oxychloride | 153.4 |
| Methanol | 32.0 |
| Capryl alcohol | 162.5 |
| Phenol | 98.7 |
| Sodium hydroxide (assay 48.1%) | 87.2 |
| Water | 160.0 |

In this particular example, the methyl phosphoryl dichloride is made by adding methanol to the phosphorus oxychloride starting at +5° C. and as soon as sufficient methanol has been added to keep the reaction mass from freezing at 0° C., the remainder of the alcohol is added keeping the reaction mass temperature between 0° C. and −5° C. The remaining conditions are the same as described under Example I.

EXAMPLE VIII

*n-Hexadecyl isopropyl phenyl phosphate*

In accordance with the procedure described in Example I, n-hexadecyl isopropyl phenyl phosphate is obtained utilizing the following ingredients:

|  | G. |
|---|---|
| Phosphorus oxychloride | 153.4 |
| n-Hexadeconal | 242.4 |
| Isopropyl alcohol | 66.1 |
| Phenol | 102.0 |
| Sodium hydroxide (assay 49.6%) | 87.2 |
| Water | 145.0 |

From these charges of materials 218.8 g. of n-hexadecyl isopropyl phenyl phosphate is produced. The ester has the following properties:

| | |
|---|---|
| Specific gravity, 25°/25° C | 0.9422 |
| $N_D^{25}$ | 1.4633 |
| Viscosity, centistokes: | |
| At 210° F | 3.0 |
| At 100° F | 10.8 |

EXAMPLE IX

*n-Hexadecyl sec-tetradecyl phenyl phosphate*

In accordance with the procedure described in Example I, n-hexadecyl sec-tetradecyl phenyl phosphate is obtained utilizing the following ingredients:

|  | G. |
|---|---|
| Phosphorus oxychloride | 153.4 |
| n-Hexadecanol | 242.4 |
| Sec-tetradecyl alcohol | 214.2 |
| Phenol | 98.5 |
| Sodium hydroxide (assay 49.6%) | 84.5 |
| Water | 150.0 |

The sec-tetradecanol used in this example was 7-ethyl-2-methyl-4-undecanol.

While specific quantities, temperatures and reaction conditions have been set forth in the preceding examples, it is not intended that this invention be restricted solely thereto, as to a certain degree these quantities, temperatures and reaction conditions may be subject to variation. In the preparation of these novel phosphate esters, it is essential that the phosphorus oxychloride be reacted first with the primary alcohol to form the monoalkyl phosphoryl dichloride inasmuch as secondary alcohols do not satisfactorily react with phosphorus oxychloride to form a monoalkyl phosphoryl dichloride. The secondary alcohols will, however, react with a monoalkyl phosphoryl dichloride to form a dialkyl phosphoryl chloride. Any of the various procedures well known to those skilled in the art may be utilized for the preparation of the alkyl phosphoryl dichloride. A particularly advantageous method of preparation is by the reaction of POCl₃ and a primary alkyl alcohol. If such a reaction is utilized, it is preferred that approximately equimolecular proportions of the reactants be utilized. In the case of the lower alcohols, i. e., those containing from 1 to 5 carbon atoms, a slight excess of the alcohol may be utilized and the alkyl phosphoryl dichloride purified by distillation. In the case of the higher aliphatic alcohols, i. e., those containing more than 5 carbon atoms, approximately equimolecular proportions of the reactants are utilized inasmuch as the reaction is essentially quantitative and purification by distillation under commercially practical temperatures and pressures is not feasible due to the decomposition of the monoalkyl phosphoryl dichloride.

The temperature at which the reaction between the primary alcohol and the phosphorus oxychloride is carried out is governed principally by the freezing point of the phosphorus oxychloride and the color of the finished product desired. Since phosphorus oxychloride crystallizes at approximately 2° C., initial reaction temperatures below 2° C. are not practical. Once the reaction is begun, the temperature may then be reduced below 2° C. as the alcohol added and the alkyl phosphoryl dichloride formed depress the crystallizing point of the mass so that lower temperatures may be maintained. As the temperature of the reaction is increased greater than 25° C., the color of the monoalkyl phosphoryl dichloride is increased resulting in more highly colored phosphate esters subsequently prepared from the alkyl phosphoryl dichloride. In the case of the lower alkyl phosphoryl dichlorides, such as methyl phosphoryl dichloride, it is preferred that the temperature be maintained below about 5° C. in order to keep the formation of methyl chloride to a minimum. It is, therefore, preferred that this reaction for the formation of monoalkyl phosphoryl dichlorides be carried out at a temperature not in excess of about 25° C. After the reaction is substantially complete, however, the temperature may be increased to a maximum of 50° C. to facilitate the removal of the hydrogen chloride gas evolved in the reaction.

It is preferred in this reaction that the alcohol be added to the POCl₃. While the reverse order of addition of reactants may be utilized, such a reverse order promotes the formation of the dialkyl phosphoryl chloride and trialkyl phosphate ester, thereby affecting the purity of the final product.

The reaction between the secondary aliphatic alcohol and the monoalkyl phosphoryl dichloride prepared as described above proceeds at a much slower rate than does the preparation of the monoalkyl phosphoryl dichloride. In this reaction it is preferred that at least a one molecular proportion of the secondary alcohol be utilized for each one molecular proportion of the monoalkyl phosphoryl dichloride. Particularly advantageous results are obtained when from 1.0 to about 1.5 molecular proportions of the secondary aliphatic alcohol are utilized for each one molecular proportion of the monoalkyl phosphoryl dichloride. The temperature maintained during this reaction may be varied over a substantial range, such as in the range of from about −10° C. to about 50° C. Preferably, however, the reaction temperature is maintained in the range of from about 0° C. to about 25° C.

During both of the above described reactions, hydrogen chloride gas is evolved and this gas may be removed by any method which is particularly convenient. Thus, the hydrogen chloride gas may be removed by merely allowing it to escape naturally, by blowing the reaction mixture with air or by keeping the reaction mixture under reduced pressure, with the latter method being preferred. In the first step of this process, i. e., in the preparation of monoalkyl phosphoryl dichloride, secession of the evolution of hydrogen chloride gas is an indication of the end of the reaction. In the second step of this process, i. e., the formation of the dialkyl phosphoryl chloride, the end of the reaction may be determined by the chlorine content of the reaction mixture, stopping the reaction when analysis shows that the reaction mixture contains from about 0.95 to about 1.10 gram-atoms of chlorine per mol of phosphorus oxychloride charged initially.

While the use of unsubstituted primary alkyl alcohols containing from 1 to 18 carbon atoms and unsubstituted secondary alkyl alcohols containing from 3 to 18 carbon atoms constitutes a preferred embodiment of this invention, the primary and secondary alkyl alcohols may be substituted with one or more unreactive, from the standpoint of this process, substituents. Thus, the alcohol may be substituted with nitro groups, aryl groups such as phenyl, alkoxy groups, such as ethoxy, butoxy, isopropoxy-propoxy, etc.

The reaction between the dialkyl phosphoryl monochloride and the alkali metal salt of an arylate is preferably carried out by reacting the dialkyl phosphoryl monochloride with an aqueous solution of the alkali metal arylate although an aqueous slurry may be used. Preferably, approximately one molecular proportion of the alkali metal arylate is utilized for each one molecular proportion of the dialkyl phosphoryl monochloride. Excessive quantities of the alkali metal arylate have no deleterious effect upon the nature of the reaction but necessitate more extensive refining procedures in order to obtain a substantially pure phosphate ester. The reaction between the dialkyl phosphoryl monochloride and the alkali metal arylate contained in an aqueous solution may be carried out at a temperature in the range of from about −10° C. to about 50° C. Particularly advantageous results are obtained when the temperature is maintained within the range of from about 0° C. to about 25° C.

In carrying out this reaction between the dialkyl phosphoryl monochloride and the alkali metal arylate contained in an aqueous solution, it is highly preferred that the dialkyl phosphoryl monochloride be added to the alkali metal arylate solution in order to obtain a phosphate ester of a higher degree of purity. Reversing the order of addition of the reactants promotes hydrolysis with subsequent low yields of the finished product and the formation of a considerable amount of impurities.

In preparing the novel compounds of this invention, any alkali metal arylate may be used. Typical of such compounds are the sodium, potassium and lithium salts of a phenol. The phenol may be unsubstituted or it may be substituted with one or more inert substituents. Typical of such substituents are the halogens, such as chlorine, bromine, iodine and fluorine; alkyl substituents, such as methyl, ethyl, propyl, isopropyl, butyl, octyl, etc.; aryl substituents, such as the phenyl radical; nitro groups; alkoxy groups, such as methoxy, ethoxy, propoxy, isopropoxy, etc. In preparing the novel phosphate esters of this invention, the alkali metal salts of the naphthols may also be utilized, in which case the naphthol may be unsubstituted or substituted with one or more of the above described inert substituents. By inert substituents is meant a substituent that is not reactive from a standpoint of the process of this invention.

The esters prepared by this invention are of such a degree of purity that purification by fractionation is unnecessary although they may be so purified, if desired. Usually all that is required are simple water and aqueous alkali washes followed by dehydration under vacuum. If, however, excessive quantities of the alcohols have been used in preparing the intermediate, this excess may be removed by a simple steaming procedure well known to those skilled in the art. This steaming operation can then be followed by dehydration in the normal manner.

As previously stated, the novel esters of this invention have been found to possess exceptional utility as functional fluids and as plasticizers for various types of resins. Their utility in the field of functional fluids is made clearly evident by a consideration of their physical properties set forth in the preceding examples. While there are many materials which may serve as functional fluids at ordinary temperatures and even at elevated temperatures, few materials have proved satisfactory at sub-zero temperature, because of the tendency of such materials to crystallize or solidify at these low temperatures. It has been found, however, that the novel class of phosphate esters claimed herein possess exceptionally low pour points, i. e., around —65° F. This property coupled with their excellent viscosity characteristics at elevated, ordinary and sub-normal temperatures, and their relative non-flammability, very clearly indicates the increased and unexpected utility of this novel class of phosphate esters over related materials disclosed in the art in the field of functional fluids.

As plasticizers for various synthetic resins, particularly vinyl halide polymers, the novel esters of this invention possess outstanding utility. Polyvinyl chloride compositions plasticized with the novel esters of this invention are exceedingly tough and flexible, retaining their unusual flexibility characteristics even at temperatures as low as —40° C. The following examples are illustrative of the manner in which such enhanced plasticized compositions can be prepared and their characteristics:

EXAMPLE X

A mixture of 60 parts by weight of polyvinyl chloride and 40 parts by weight of 2-ethylhexyl capryl phenyl phosphate is mixed on a differential roll mill maintained at a temperature of 325° F. for a period of approximately five minutes, whereupon a homogeneous plasticized polyvinyl chloride composition is formed. The resulting composition is pressed into the form of a sheet in a suitable mould under a pressure of approximately 4,000 pounds per square inch, and at a temperature of 325° F.

The plasticized polyvinyl chloride sheet thus obtained is transparent and quite flexible, both at room temperature and at relatively low temperatures. The composition thus obtained possesses a low temperature flexibility of —47° C. when determined in accordance with the method of Clash and Berg as described in Ind. Eng. Chem. 34, 1218 (1942), a method well known to those skilled in the art of the evaluation of polyvinyl chloride compositions.

EXAMPLE XI

The procedure set forth in Example X is repeated utilizing in place of the 2-ethylhexyl capryl phenyl phosphate, 40 parts by weight of 2-ethylhexyl sec-butyl cresyl phosphate. The composition thus obtained is quite similar to that obtained in Example X and has a low temperature flexibility of —44° C.

In such plasticized compositions, the novel phosphate esters of this invention may be utilized as the sole plasticizer for the vinyl chloride-containing polymer or they may be used in combination with one or more of the commonly used plasticizers for vinyl chloride-containing polymers, thereby obtaining a composition having physical properties attributable to or resulting from, each of the plasticizer components. Typical of such plasticizers which may be utilized in combination with these phosphate esters are di(2-ethylhexyl) phthalate, dibutyl phthalate, tricresyl phosphate, alkyl diaryl phosphates, tri(2-ethylhexyl) phosphate, dioctyl adipate, dibutyl sebacate, alkyl benzyl phthalates, etc. Such resinous compositions may also have incorporated therein various pigments, fillers, stabilizers, both heat and light, etc.

Copolymers of vinyl chloride and other unsaturated materials copolymerizable therewith may also be plasticized with the novel phosphate esters of this invention. For example, copolymers of vinyl chloride with such materials as vinylidene chloride; vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, ortho-chlorostyrene, para - chlorostyrene, 2,5 - dichlorostyrene, 2,4-dichlorostyrene, para-ethyl styrene, divinyl benzene, vinyl naphthenate, alpha-methyl styrene; dienes, such as butadiene, chloroprene; amides, such as acrylic acid amide, acrylic acid anilide; nitriles, such as acrylic acid nitrile; esters of alpha, beta-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids and the like. The class of copolymers in which a predominant portion, i. e., more than 50% by weight, of the copolymer is made from vinyl chloride, represents a preferred class of polymers to be treated according to the invention.

A particularly useful type of plasticized composition comprises a phosphate ester of this invention and a polymer prepared by copolymerizing vinyl chloride and an ester of an alpha, beta-unsaturated dicarboxylic acid, such as diethyl maleate, in which 5 to 20 parts by weight of diethyl maleate are utilized for every 95 to 80 parts by weight of vinyl chloride. Among the preferred esters of alpha, beta-unsaturated dicarboxylic acids are the alkyl esters in which the alkyl group contains from 1 to 8 carbon atoms.

In addition to the above described vinyl chloride-containing polymers, similar polymers wherein the vinyl chloride is replaced, either in whole or in part, by other vinyl halides may be utilized. Typical of such other vinyl halides are vinyl bromide, vinyl fluoride, etc.

While the novel phosphate esters of this invention are particularly useful as plasticizers for vinyl halide-containing polymers, they may also be utilized as modifiers for cellulose nitrate surface coatings and the cellulose esters and ethers.

What is claimed is:

1. As new chemical compounds, the dialkyl monoaryl esters of ortho-phosphoric acid having the formula

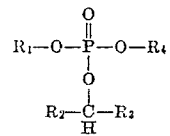

wherein $R_1$ represents an alkyl radical containing from 1 to 18 carbon atoms, in which there are at least 2 hydrogen atoms on the carbon atom bonded to the phosphate radical, $R_2$ represents the methyl radical, $R_3$ represents an alkyl radical containing 1 to 6 carbon atoms, and $R_4$ represents a phenyl radical.

2. As new chemical compounds, the dialkyl monoaryl esters of ortho-phosphoric acid having the formula

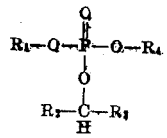

wherein $R_1$ represents the 2-ethylhexyl radical, $R_2$ represents the methyl radical, $R_3$ represents an alkyl radical containing 2 to 6 carbon atoms and $R_4$ represents the phenyl radical.

3. 2-ethylhexyl sec-butyl phenyl phosphate.
4. 2-ethylhexyl sec-butyl cresyl phosphate.
5. 2-ethylhexyl sec-butyl p-chlorophenyl phosphate.
6. 2-ethylhexyl capryl phenyl phosphate.
7. n-Hexadecyl isopropyl phenyl phosphate.
8. A process for the preparation of dialkyl monoaryl esters of ortho-phosphoric acid having the formula

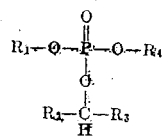

wherein $R_1$ represents an alkyl radical in which there are at least 2 hydrogen atoms on the carbon atom bonded to the phosphate radical, $R_2$ and $R_3$ represent alkyl radicals and $R_4$ represents an aryl radical, which comprises reacting a monoalkyl phosphoryl dichloride and a secondary alkyl alcohol to form a dialkyl phosphoryl monochloride, and reacting the dialkyl phosphoryl monochloride with an alkali metal salt of an arylate.

9. A process for the preparation of dialkyl monoaryl esters of ortho-phosphoric acid having the formula

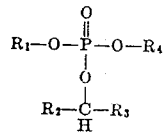

wherein $R_1$ represents an alkyl radical in which there are at least 2 hydrogen atoms on the carbon atom bonded to the phosphate radical, $R_2$ and $R_3$ represent alkyl radicals, and $R_4$ represents an aryl radical which comprises reacting a dialkyl phosphoryl monochloride having the formula

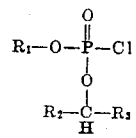

wherein $R_1$, $R_2$ and $R_3$ are alkyl radicals as defined above, with an alkali metal salt of an arylate.

10. A process for the preparation of dialkyl monoaryl esters of ortho-phosphoric acid having the formula

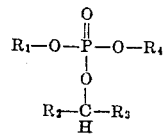

wherein $R_1$ represents an alkyl radical containing from 1 to 18 carbon atoms in which there are at least 2 hydrogen atoms on the carbon atom bonded to the phosphate radical, $R_2$ and $R_3$ represent alkyl radicals which together contain not more than 17 carbon atoms, and $R_4$ represents an aryl radical, which comprises reacting phosphorus oxychloride and a primary alkyl alcohol containing from 1 to 18 carbon atoms to form a monoalkyl phosphoryl dichloride, reacting the monoalkyl phosphoryl dichloride thus formed with a secondary alkyl alcohol containing from 3 to 18 carbon atoms to form a dialkyl phosphoryl monochloride, and reacting the dialkyl phosphoryl monochloride with an alkali metal salt of an arylate.

11. In a process for the preparation of dialkyl monoaryl esters of ortho-phosphoric acid having the formula

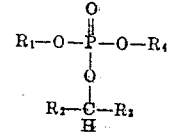

where $R_1$ represents an alkyl radical containing from 1 to 18 carbon atoms in which there are at least 2 hydrogen atoms on the carbon atom bonded to the phosphate radical, $R_2$ and $R_3$ represent alkyl radicals which together contain not more than 17 carbon atoms, and $R_4$ represents an aryl radical, the steps comprising reacting phosphorus oxychloride and a primary alkyl alcohol containing from 1 to 18 carbon atoms while maintaining a reaction temperature in the range of from about $+2°$ C. to about $+25°$ C. until the reaction between the primary alcohol and the phosphorus oxychloride is substantially complete and while removing the hydrogen chloride formed, and thereafter continuing the removal of the hydrogen chloride formed at a temperature not exceeding about 50° C., to form a monoalkyl phosphoryl dichloride; reacting the monoalkyl phosphoryl dichloride thus formed with a secondary alkyl alcohol containing from 3 to 18 carbon atoms while maintaining a temperature in the range of from about $-10°$ C. to about 50° C. and while removing the hydrogen chloride formed, to form a dialkyl phosphoryl monochloride; and reacting said dialkyl phosphoryl monochloride with an alkali metal salt of an arylate contained in an aqueous medium while maintaining a reaction temperature in the range of from about $-10°$ C. to about $+50°$ C.

12. In a process for the preparation of 2-ethylhexyl sec-butyl phenyl phosphate, the steps comprising reacting phosphorus oxychloride and 2-ethylhexyl alcohol while maintaining a reaction temperature in the range of from about $+2°$ C. to about $+25°$ C. until the reaction between the alcohol and the phosphorus oxychloride is substantially complete and while removing the hydrogen chloride formed, and thereafter continuing the removal of the hydrogen chloride formed at a temperature not exceeding about 50° C., to form 2-ethylhexyl phosphoryl dichloride; reacting the 2-ethylhexyl phosphoryl dichloride thus formed with sec-butyl alcohol while maintaining a temperature in the range of from about $-10°$ C. to about $+50°$ C., and while removing the hydrogen chloride formed, to form 2-ethylhexyl sec-butyl phosphoryl monochloride; and reacting said 2-ethylhexyl sec-butyl phosphoryl monochloride with an alkali metal salt of phenol contained in an aqueous medium while maintaining a reaction temperature in the range of from about $-10°$ C. to about $+50°$ C.

13. In a process for the preparation of 2-ethylhexyl sec-butyl cresyl phosphate, the steps comprising reacting phosphorus oxychloride and 2-ethylhexyl alcohol while maintaining a reaction temperature in the range of from about $+2°$ C. to about $+25°$ C. until the reaction between the alcohol and the phosphorus oxychloride is substantially complete and while removing the hydrogen chloride formed, and thereafter continuing the removal of the hydrogen chloride formed at a temperature not exceeding about 50° C., to form 2-ethylhexyl phosphoryl dichloride; reacting the 2-ethylhexyl phosphoryl dichloride thus formed with sec-butyl alcohol while maintaining a temperature in the range of from about $-10°$ C. to about $+50°$ C., and while removing the hydrogen chloride formed, to form 2-ethylhexyl sec-butyl phosphoryl monochloride; and reacting said 2-ethylhexyl sec-butyl phosphoryl monochloride with an alkali metal salt of cresol contained in an aqueous medium while maintaining a reaction temperature in the range of from about −10° C. to about +50° C.

14. In a process for the preparation of 2-ethylhexyl sec-butyl p-chlorophenyl phosphate, the steps comprising reacting phosphorus oxychloride and 2-ethylhexyl alcohol while maintaining a reaction temperature in the range of from about +2° C. to about +25° C. until the reaction between the alcohol and the phosphorus oxychloride is substantially complete and while removing the hydrogen chloride formed, and thereafter continuing the removal of the hydrogen chloride formed at a temperature not exceeding about 50° C. to form 2-ethylhexyl phosphoryl dichloride; reacting the 2-ethylhexyl phosphoryl dichloride thus formed with sec-butyl alcohol while maintaining a temperature in the range of from about −10° C. to about +50° C., and while removing the hydrogen chloride formed, to form 2-ethylhexyl sec-butyl phosphoryl monochloride; and reacting said 2-ethylhexyl sec-butyl phosphoryl monochloride with an alkali metal salt of p-chlorophenol contained in an aqueous medium while maintaining a reaction temperature in the range of from about −10° C. to about +50° C.

15. In a process for the preparation of 2-ethylhexyl capryl phenyl phosphate, the steps comprising reacting phosphorus oxychloride and 2-ethylhexyl alcohol while maintaining a reaction temperature in the range of from about +2° C. to about +25° C. until the reaction between the alcohol and the phosphorus oxychloride is substantially complete and while removing the hydrogen chloride formed, and thereafter continuing the removal of the hydrogen chloride formed at a temperature not exceeding about 50° C. to form 2-ethylhexyl phosphoryl dichloride; reacting the 2-ethylhexyl phosphoryl dichloride thus formed with capryl alcohol while maintaining a temperature in the range of from about −10° C. to about +50° C., and while removing the hydrogen chloride formed, to form 2-ethylhexyl capryl phosphoryl monochloride; and reacting said 2-ethylhexyl capryl phosphoryl monochloride with an alkali metal salt of phenol contained in an aqueous medium while maintaining a reaction temperature in the range of from about −10° C. to about +50° C.

16. In a process for the preparation of n-hexadecyl isopropyl phenyl phosphate, the steps comprising reacting phosphorus oxychloride and n-hexadecyl alcohol while maintaining a reaction temperature in the range of from about +2° C. to about +25° C. until the reaction between the alcohol and the phosphorus oxychloride is substantially complete and while removing the hydrogen chloride formed, and thereafter continuing the removal of the hydrogen chloride formed at a temperature not exceeding about 50° C. to form n-hexadecyl phosphoryl dichloride; reacting the n-hexadecyl phosphoryl dichloride thus formed with isopropyl alcohol while maintaining a temperature in the range of from about −10° C. to about +50° C., and while removing the hydrogen chloride formed, to form n-hexadecyl isopropyl phosphoryl monochloride; and reacting said n-hexadecyl isopropyl phosphoryl monochloride with an alkali metal salt of phenol contained in an aqueous medium while maintaining a reaction temperature in the range of from about −10° C. to about +50° C.

References Cited in the file of this patent
UNITED STATES PATENTS

| | | |
|---|---|---|
| 1,844,408 | Nicolai | Feb. 9, 1932 |
| 2,005,619 | Graves | June 18, 1935 |
| 2,285,853 | Downing et al. | June 9, 1942 |
| 2,520,393 | Fletcher | Aug. 29, 1950 |